(12) United States Patent
Husted

(10) Patent No.: US 8,340,621 B1
(45) Date of Patent: *Dec. 25, 2012

(54) WIRELESS DEVICE USING A SHARED GAIN STAGE FOR SIMULTANEOUS RECEPTION OF MULTIPLE PROTOCOLS

(75) Inventor: Paul J. Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/541,284

(22) Filed: Aug. 14, 2009

Related U.S. Application Data

(63) Continuation-in-part of application No. 12/323,338, filed on Nov. 25, 2008.

(60) Provisional application No. 61/116,239, filed on Nov. 19, 2008.

(51) Int. Cl.
  *H04B 1/28* (2006.01)

(52) U.S. Cl. ..... 455/333; 455/240; 455/334; 455/552.1; 375/345

(58) Field of Classification Search ........ 455/132, 455/137, 138, 230, 232.1, 234.1, 240.1, 323, 455/333, 334, 552.1, 553.1; 375/345
See application file for complete search history.

(56) References Cited

U.S. PATENT DOCUMENTS

| | | | |
|---|---|---|---|
| 6,643,522 B1 | 11/2003 | Young | |
| 6,944,427 B2 | 9/2005 | Haub et al. | |
| 6,970,681 B2 | 11/2005 | Darabi et al. | |
| 7,106,816 B2 | 9/2006 | Filipovic | |
| 7,228,103 B2 | 6/2007 | Nowlin | |
| 7,239,890 B2 | 7/2007 | Kitami et al. | |
| 7,519,390 B2 | 4/2009 | Malone et al. | |
| 7,912,428 B2 * | 3/2011 | Behzad et al. | 455/76 |
| 2005/0059347 A1 | 3/2005 | Haartsen | |
| 2005/0159180 A1 | 7/2005 | Cheng et al. | |
| 2007/0109973 A1 | 5/2007 | Trachewsky | |
| 2007/0207751 A1 | 9/2007 | Behzad | |
| 2007/0207752 A1 | 9/2007 | Behzad | |
| 2008/0043705 A1 | 2/2008 | Desai et al. | |
| 2008/0080453 A1 | 4/2008 | Rofougaran | |
| 2008/0084922 A1 | 4/2008 | Kleveland et al. | |
| 2008/0123610 A1 | 5/2008 | Desai et al. | |
| 2008/0139118 A1 | 6/2008 | Sanguinetti | |
| 2008/0139123 A1 | 6/2008 | Lee et al. | |
| 2008/0139151 A1 | 6/2008 | Ojo et al. | |
| 2008/0311852 A1 * | 12/2008 | Hansen et al. | 455/41.2 |
| 2009/0117938 A1 * | 5/2009 | Georgantas et al. | 455/552.1 |
| 2009/0239471 A1 | 9/2009 | Tran et al. | |
| 2010/0322222 A1 | 12/2010 | Desai | |
| 2011/0002257 A1 | 1/2011 | Behzad et al. | |
| 2011/0075596 A1 | 3/2011 | Moreira et al. | |

* cited by examiner

*Primary Examiner* — Nhan Le

(74) *Attorney, Agent, or Firm* — Bay Area Technology Law Group PC

(57) ABSTRACT

A wireless device that can process signals according to multiple wireless protocols simultaneously and without signal loss. The wireless device may comprise an antenna and first and second wireless protocol circuitry. The first wireless protocol circuitry comprises a shared gain element that amplifies signals that are processed by each of the first and second wireless protocol circuitry. Since the third signals are amplified by the shared gain element prior to being split out to the respective protocol circuitry, the first and second portions of the amplified third signals do not have significant signal loss relative to the third signals provided by the antenna. Thus the wireless device can receive and process wireless signals according to both the first and second protocols simultaneously without any significant signal losses due to splitting of the receive signal.

19 Claims, 3 Drawing Sheets

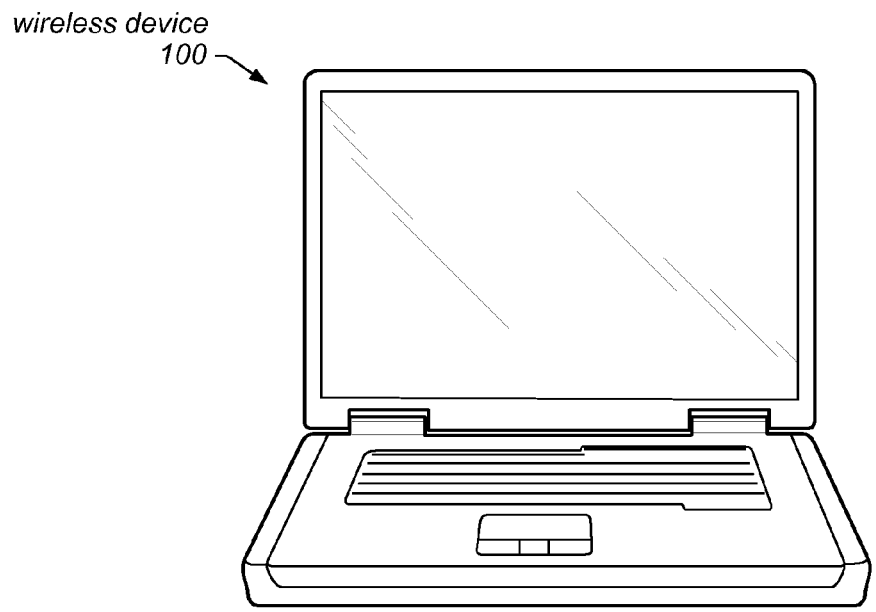
FIG. 1A
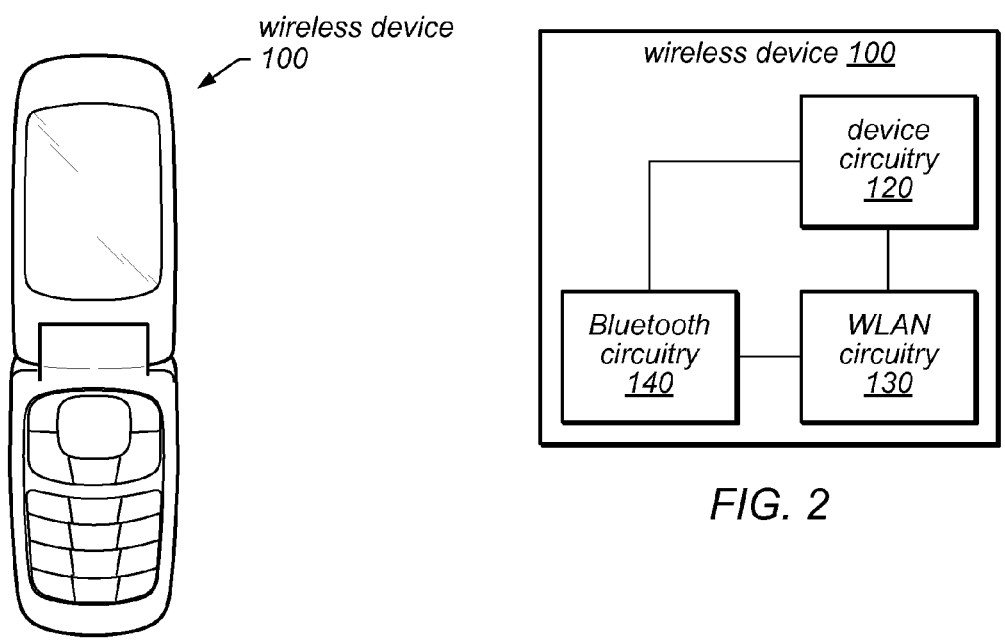
FIG. 1B
FIG. 2

WIRELESS DEVICE USING A SHARED GAIN STAGE FOR SIMULTANEOUS RECEPTION OF MULTIPLE PROTOCOLS

PRIORITY CLAIM

This application is a continuation-in-part of U.S. application Ser. No. 12/323,338, titled "Wireless Device Using A Shared Gain Stage For Simultaneous Reception Of Multiple Protocols", filed Nov. 25, 2008, whose inventors are Paul J. Husted, Srenik Mehta, and Soner Ozgur, which claims benefit of priority of U.S. provisional application Ser. No. 61/116,239, titled "Wireless Device Using A Shared Gain Stage For Simultaneous Reception Of Multiple Protocols", filed Nov. 19, 2008, whose inventors are Paul J. Husted, Srenik Mehta, and Soner Ozgur. The above named documents are hereby incorporated by reference in their entirety as though fully and completely set forth herein.

BACKGROUND OF THE INVENTION

1. Field of the Disclosure

The present invention relates generally to wireless communication, and more particularly to reception of wireless signals of different wireless protocols using a shared gain stage to reduce signal loss.

2. Description of the Related Art

Wireless communication is being used for a plethora of applications, such as in laptops, cell phones, and other wireless communication devices ("wireless devices"). In fact, wireless communication is becoming so widely used, it is common for wireless devices to be able to communicate using a plurality of different wireless communication protocols. Accordingly, it is common for a wireless device to have different circuit portions that implement different wireless protocols.

When a wireless device receives a wireless signal on its antenna, the signal is converted to baseband and then provided (split) to the different circuit portions that implement the different wireless protocols. In one prior art implementation, a splitter is placed before the signal is provided to the different circuit portions. Thus only half of the original signal energy is provided to each of the different circuit portions. As a result, each of the split signals suffers a 3 dB loss in sensitivity. In another prior art implementation, the device uses a switch to switch the signal to the different circuit portions. However, only one circuit portion may be used at a time, and the device is not able to simultaneously receive multiple signals of different wireless protocols. Therefore, improvements in wireless devices are desired.

SUMMARY OF THE INVENTION

Embodiments of the invention relate to a wireless device that can process signals according to multiple wireless protocols simultaneously and without signal loss. The wireless device may comprise an antenna for receiving wireless signals, first wireless protocol circuitry, and second wireless protocol circuitry. The first wireless protocol circuitry is coupled to the antenna and configured to receive first signals from the antenna and process the first signals according to the first wireless protocol. The second wireless protocol circuitry is coupled to the antenna and configured to receive second signals from the antenna and process the second signals according to the second wireless protocol. The first wireless protocol circuitry may comprise at least one shared gain element, i.e., a gain element that amplifies signals that are processed by each of the first and second wireless protocol circuitry. In other words, the at least one shared gain element may be utilized for amplifying signals for both the first wireless protocol circuitry and the second wireless protocol circuitry.

When the wireless device is receiving third signals having components according to both the first and second wireless protocols, the first wireless protocol circuitry receives the third signals from the antenna, and the shared gain element amplifies the third signals to produce amplified third signals. At least a first portion of the amplified third signals is processed by the first wireless protocol circuitry, and at least a second portion of the amplified third signals is provided from the first wireless protocol circuitry to the second wireless protocol circuitry for processing. Thus when both the first and second wireless protocol circuitry is operating, the third signals are provided first to the first wireless protocol circuitry, where the third signals are amplified and then split out for processing to the respective first and second wireless protocol circuitry.

Since the third signals are amplified by the shared gain element prior to being split out to the respective protocol circuitry, the first and second portions of the amplified third signals do not have significant signal-to-noise degradation relative to the third signals provided by the antenna. Thus the wireless device can receive and process wireless signals according to both the first and second protocols simultaneously without any significant signal-to-noise degradation due to splitting of the receive signal.

In one embodiment, the first wireless protocol circuitry is configured to dynamically adjust a gain of the shared gain element. The first wireless protocol circuitry may also include a second gain element which may also be dynamically adjusted. The second gain element may be configured to receive the second portion of the amplified third signals, amplify or attenuate the second portion, and provide the second portion to the second wireless protocol circuitry. The gain of the second gain element may be dynamically adjusted based on the gain of the shared gain element, e.g., in an inversely proportional relationship, such that the second portion of the amplified third signals, which are provided to the second wireless protocol circuitry, have a substantially constant gain (and hence a constant differential) relative to the third signals received by the first wireless protocol circuitry. Thus, signals of appropriate signal strength may be provided to the first wireless protocol circuitry without varying the signals received by the second wireless protocol circuitry in a way which the second wireless protocol circuitry is unaware of.

One embodiment of the invention relates to a chip (e.g., an electronic device or semiconductor device) for use in a wireless device that implements a first wireless protocol. The chip is intended to operate in a wireless device that implements the first wireless protocol as well as a second wireless protocol. The chip may comprise first wireless protocol circuitry configured to process received first signals according to the first wireless protocol and first and second gain elements coupled to the first wireless protocol circuitry. The chip is configured to receive second signals having components according to both the first wireless protocol and the second wireless protocol. The first gain element on the chip is configured to amplify the second signals to produce amplified second signals, wherein a first portion of the amplified second signals is processed by the first wireless protocol circuitry, and a second portion of the amplified second signals is provided to the second gain element, which adjusts their signal strength such that the second portion of the amplified second signals have a constant gain relative to the received second signals. The second gain element then provides the second portion of the amplified second signals external to the chip for processing.

Another embodiment relates to a chip for use in a wireless device that implements a second wireless protocol, wherein the chip is intended to operate in a wireless device that implements a first wireless protocol and the second wireless protocol. The chip may comprise a first input configured to receive first signals that only have components according to the second wireless protocol. The first input may also be configured to receive amplified second signals having components according to both the first and second wireless protocols. The chip may comprise a second input configured to receive a third signal indicating wither the chip is receiving first signals or amplified second signals. The chip may further comprise second wireless protocol circuitry coupled to the first input and the second input. The second wireless protocol circuitry may be configured to process the first signals and the amplified second signals according to the second wireless protocol.

BRIEF DESCRIPTION OF THE DRAWINGS

A better understanding of the present invention can be obtained when the following Detailed Description of the Embodiments is read in conjunction with the following drawings, in which:

FIGS. 1A and 1B illustrates exemplary wireless devices, according to one embodiment;

FIG. 2 is an exemplary block diagram of the wireless devices of FIGS. 1A and 1B, according to one embodiment;

Figure 3:
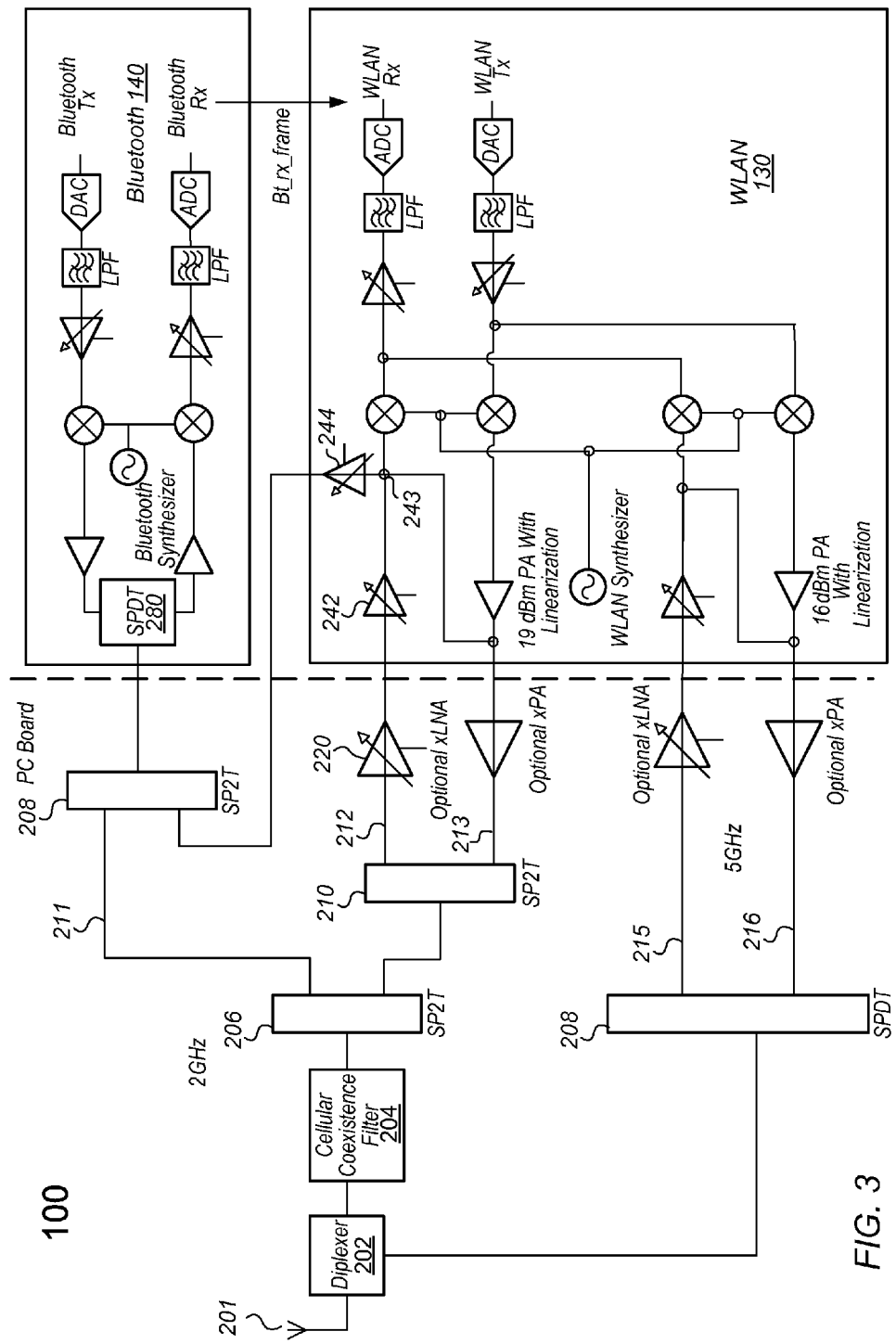
FIG. 3 is a more detailed exemplary block diagram of the wireless devices of FIGS. 1A and 1B, illustrating Bluetooth circuitry and WLAN circuitry of the exemplary wireless devices, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

FIGS. 1A and 1B—Exemplary Wireless Devices

FIGS. 1A and 1B illustrate an exemplary wireless device 100, according to one embodiment. As shown in FIG. 1A, the wireless device 100 may be a portable computer or other mobile computing device. Alternatively, as shown in FIG. 1B, the wireless device 100 may be a cell phone or smart phone or other similar mobile device (which may also be classified as a mobile computing device). However, it should be noted that other wireless devices are envisioned, such as personal digital assistants, multimedia players (portable or stationary), routers, and/or other mobile devices/computing systems which are operable to use wireless communication.

The wireless device 100 may be configured to perform wireless communication using a first wireless protocol and/or a second wireless protocol. For example, the wireless device 100 may be configured to perform wireless communication using only the first wireless protocol, using only the second wireless protocol, or simultaneously using both the first and second wireless protocol. The first and second wireless protocols may be any of various types of protocols. In some embodiments, the first wireless protocol may be a wireless local area network (WLAN) protocol. Additionally, the second wireless protocol may be a short range wireless communication protocol, such as Bluetooth. As used herein, a short range wireless protocol may refer to wireless protocols which support distances of up to 1 meter to 10 meters, or in higher powered devices, 100 meters.

FIG. 2—Exemplary Block Diagram of the Wireless Device

As shown in FIG. 2, the wireless device 100 may include device circuitry 120 (for performing various functions of the wireless device), first wireless protocol circuitry 130, and second wireless protocol circuitry 140. Each of the first wireless protocol circuitry 130 and the second wireless protocol circuitry 140 may be implemented in any of various ways, such as analog logic, digital logic, a processor and memory (such as a CPU, DSP, microcontroller, etc.), an ASIC (application specific integrated circuit), an FPGA (field programmable gate array), or any combination of the above.

The first wireless protocol circuitry 130 may be comprised on a first chip, and the second wireless protocol circuitry 140 may be comprised on a second chip. As used herein, the term "chip" has the full extent of its ordinary meaning, and includes an electronic device, e.g., a semiconductor device, that may be implemented in any of the ways described above for the first wireless protocol circuitry 130 and the second wireless protocol circuitry 140.

In one exemplary embodiment, the first wireless protocol circuitry 130 may be WLAN circuitry 130 and the second wireless protocol circuitry 140 may be Bluetooth circuitry 140. The WLAN circuitry 130 and the Bluetooth 140 circuitry may be co-located, e.g., may be located in the same wireless device 100. The device 100 may include logic for providing a received signal to each of the first wireless protocol circuitry 130 and the second wireless protocol circuitry 140 without any loss in sensitivity.

In one embodiment, the wireless device 100 may include a shared gain element that is used by both the first wireless protocol circuitry 130 and the second wireless protocol circuitry 140. The shared gain element may be comprised in the first wireless protocol circuitry 130 in one embodiment. The term "shared gain element" refers to a gain element (such as an amplifier, gain stage, etc.) that amplifies signals such that portions of the amplified signals are provided to each of the first and second wireless protocol circuitry 130 and 140 (or 140, FIGS. 4 and 5), respectively.

Additionally, the wireless device 100 may include one or more wireless or wired ports for communicating over a network. The wireless device 100 (e.g., the device circuitry 120) may further include one or more memory mediums and processors for implementing various functionality. The wireless device 100 may operate as described herein.

FIG. 3—Exemplary System Diagram of the Wireless Device

FIG. 3 is an exemplary system diagram of the wireless device 100. As shown, the wireless device 100 may comprise the first wireless protocol circuitry 130 (e.g., WLAN) and the second wireless protocol circuitry 140 (e.g., Bluetooth). As discussed below, the first wireless protocol circuitry 130 may be considered as comprising a shared gain element (LNA) 242, or alternatively the first wireless protocol circuitry 130 may be considered as being coupled to the shared gain element (LNA) 242.

As shown, the device 100 may comprise an antenna 201 for receiving signals. The received signal from the antenna 201 is provided to a diplexer 202. The diplexer 202 may provide one output to a cellular coexistence filter 204, and may provide a second output to the single pole double throw (SP2T) switch 208. The output of the cellular coexistence filter 204 is provided to a SP2T switch 206. The SP2T switch 206 has a first connection 211 to a SP2T switch 208 for the Bluetooth block 140, and a second connection to a SP2T switch 210 for the WLAN block 130. In an alternate embodiment, SP2T switch 206 and SP2T switch 210 may be 'combined' and instead implemented as a single SP3T switch with throws from the cellular coexistence filter 204 to connections 211, 212, and 213, if desired.

When only the Bluetooth block 140 is operating, i.e., when only Bluetooth signals are being received or transmitted, the antenna 201 is in communication with the Bluetooth block 140 through the SP2T switches 206 and 208 and through the connection 211. Thus, when only the Bluetooth block 140 is operating, the antenna 201 communicates with the Bluetooth block 140 in a bidirectional fashion through the connection 211 and the switches 206 and 208. A received Bluetooth signal on the antenna 201 is provided through SP2T switch 206 over connection 211 to SP2T switch 208 and connected through to SP2T switch 280 in the Bluetooth block 140 for processing by the Bluetooth block 140.

When only the WLAN block 130 is operating, i.e., when only wireless LAN signals are being received or transmitted, the antenna 201 is in communication with the WLAN block 130 through the SP2T switches 206 and 210, and the connections 212 and 213, as well as through the SP2T switch 208 and connections 215 and 216. The connection 212 is used for WLAN signals received by the antenna 201 destined for the WLAN block 130, and the connection 213 is used for WLAN signals generated by the WLAN block 130 and destined for the antenna 201. The connections 215 and 216 are used for processing 5 GHz WLAN signals such as those described by IEEE 802.11a (in contrast to the 2.4 GHz WLAN signals through connections 212 and 213). The WLAN (in this implementation at least, but not necessarily for all possible implementations) may operate at either 2 or 5 GHz, and in one embodiment not in both frequencies at the same time. The diplexer 202 efficiently splits the high and low frequencies, and thus receiving of shared signals (shared Rx) may occur when the WLAN is operating at 2 GHz. The 5 GHz path is only shown for completeness.

Note that references to "only Bluetooth signals being received" refers to signals being received that comprise Bluetooth signals intended for the wireless device 100, but not WLAN signals intended for the wireless device 100. It is noted that there may be various other signals present in the signal from other sources, such as other Bluetooth signals or other WLAN signals that are not intended for the wireless device 100. Similarly, references to "only WLAN signals being received" refers to signals being received that comprise WLAN signals intended for the wireless device 100, but not Bluetooth signals intended for the wireless device 100. It is noted that there may be various other signals present in the signal from other sources, such as other Bluetooth signals or other WLAN signals that are not intended for the wireless device 100.

When both WLAN signals and Bluetooth signals are being received simultaneously, then in one embodiment signals received from the antenna 201 are provided to the WLAN block 130 via connection 212. The signals may be provided through optional external low noise amplifier (xLNA) 220 to the WLAN block 130. The signals received from connection 212 and optional xLNA 220 may be provided through the low noise amplifier (LNA) 242 in the WLAN block 130. The WLAN block 130 may perform various WLAN processing on the received signals.

The WLAN block 130 may in turn provide the received signal from LNA 242 to splitter 243. The splitter 243 may operate to split the signal energy, with a first portion of the signal energy being provided to the remainder of the WLAN block 130, and a second portion of the signal energy being provided to an LNA output driver 244. The second portion of the signal energy is provided by the LNA output driver 244 to the Bluetooth block 140. The splitter 243 may or may not be equal, e.g., it may provide more energy to one path and less to the other path if desired. In one embodiment, the WLAN block 130 dynamically controls the operation of the splitter 243, including the amount of signal energy provided to each of the WLAN block 130 and the Bluetooth block 140.

Note that the signal is provided from the WLAN block 130 to the Bluetooth block 140 after being amplified by one or more LNAs 220 and 242. In one embodiment, the signal is amplified by 20 dB prior to being split by splitter 243 and provided to the Bluetooth block 140 through LNA 244. Thus, after being amplified by 20 dB, a 3 dB loss due to the splitting of the signal does not significantly impact the signal to noise ratio (SNR) of the signal. Thus the output of LNA 242 may be split by the splitter 243 into two paths, with each path having a fraction of the original signal energy, with one fraction going to the WLAN receiver, and the other fraction going to LNA 244 and then off the WLAN chip 130 to the Bluetooth section 140.

In one embodiment, the WLAN block 130 and Bluetooth block 140 are comprised on separate chips, and the LNA output driver 244 on the WLAN block 130 is intended to provide sufficient gain for the signal to be transferred off-chip and across a printed circuit board (PCB) to the chip comprising the Bluetooth block 140. The gain of LNA 244 may be variable. For example, in one embodiment, the gain of the LNA output driver 244 may be inversely proportional to the gain of LNA 242; thus, if the LNA 242 gain decreased from 28 dB to 22 dB, the gain of LNA 244 might be adjusted from −22 dB to −16 dB. The same control lines in the WLAN block that determine the variable gain of LNA 242 may also be used to control the gain of the LNA output driver 244, since in this case they will always change together. Thus, a substantially constant gain differential may be implemented between the input to LNA 242 and the output of LNA output driver 244. In this way, the WLAN block 130 can adjust the gain of the shared gain stage (LNA 242) as appropriate for WLAN processing, and yet pass signals to the Bluetooth block 140 which have a substantially constant gain delta from the antenna 201 to the Bluetooth block 140.

However, in some embodiments, the LNA output driver 244 may only compensate for variability of the LNA 242 up to a certain point. Thus, if the gain of LNA 242 were further reduced to 16 dB, the gain of LNA 244 might be adjusted to −10 dB, but any further gain reductions by the LNA might still only see the same −10 dB gain in the LNA output driver 244. This may keep the LNA output driver power 244 to a low value, and may also reduce the chance of LNA oscillation by not allowing the signal at the LNA output driver 244 to become too large.

The LNA output driver 244 may provide signals to the Bluetooth block 140 by way of the SP2T switch 208 to the SP2T switch 280, as shown. The signals may then be processed by the Bluetooth logic. Because the signals received by the Bluetooth block 140 have a constant gain (e.g., 6 dB, as in the above example, or 3 dB, 9 dB, or any value) relative to the signal at the antenna, the Bluetooth block may be able to account for this in its received signal strength indicators (RSSI) computational logic, so that accurate RSSI assessments can be made. The RSSI accuracy may decrease for very large BT signals (e.g., greater than −40 dBm, in one embodiment), but in this case, as the signal may already be classified as "very large", accurate RSSI may not be as important.

In some circumstances, e.g., if the WLAN block 130 is going to sleep or turning off shared receiving for some other reason, the Bluetooth block 140 may need to modify its assumption of the gain of signals received to the Bluetooth block 140. Thus, under these circumstances, the WLAN block 130 may pass a signal to the Bluetooth block 140 indicating that shared receive is turned off. The Bluetooth logic may then adjust its processing of received signals, including RSSI assessments, accordingly.

Thus, when both the WLAN block 130 and the Bluetooth block 140 are operating, instead of first splitting the received signal and providing these split portions to the WLAN block 130 and the Bluetooth block 140, the signal is not split, but rather is provided to only the WLAN block 130. The WLAN block 130 can amplify the signal through LNA 242 (and/or LNA output driver 244) and provide portions of the amplified signal to the Bluetooth block 140 and the remainder of the WLAN block 130. The Bluetooth block 140 can then operate on the signal received from the WLAN block 130. Since the received signal is first amplified on the WLAN block 130 before being "split out", the signal does not experience any losses.

In contrast, prior art systems would typically comprise a splitter in place of the SP2T switch 206, wherein the splitter split the receive signal and provided portions to the WLAN block 130 and the Bluetooth block 140. Thus in these prior art systems, even when the device was only receiving Bluetooth or only receiving WLAN, the signal would still be split, with half the signal energy being provided to the Bluetooth block 140 and half the signal energy being provided to the WLAN block 130. This results in a 3 dB loss in signal energy, i.e., degrades the sensitivity of each block by 3 dB. Embodiments of the invention described herein operate to allow reception of both Bluetooth and WLAN signals without requiring a loss in signal energy.

It should be noted that, although the system described herein may allow for simultaneous reception of multiple wireless protocols, it may still not be possible to transmit signals of multiple wireless protocols simultaneously in this configuration. In addition, it should be noted that, at least in some embodiments, neither Bluetooth nor WLAN may be able to simultaneously transmit and receive signals.

Figure 4:
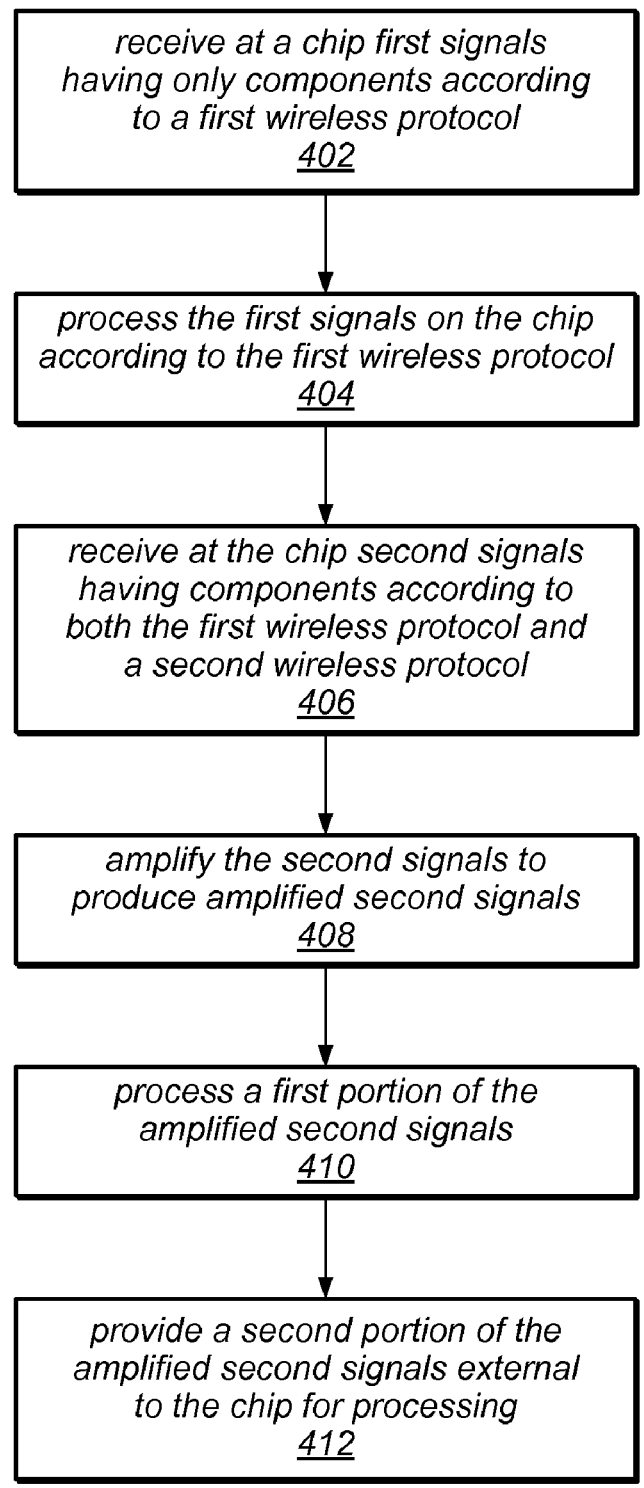
FIG. 4 is a flowchart diagram illustrating a method for simultaneously receiving wireless signals according to multiple protocols.

FIG. 4—Method for Simultaneously Receiving Wireless Signals According to Multiple Protocols FIG. 4 is a flowchart diagram illustrating a method for simultaneously receiving wireless signals according to multiple protocols. The method may be implemented by a wireless device which implements multiple protocols, e.g., a first wireless protocol and a second wireless protocol, such as the device shown in FIG. 3 and described above. More specifically, embodiments of the method may be implemented by a chip for use in a wireless device which implements multiple protocols. For example, a chip including the WLAN block 130 shown in FIG. 3 could implement part or all of the method according to various embodiments. Thus, one wireless protocol may be WLAN and the other may be Bluetooth. This exemplary embodiment will continue to be referred to below for the purpose of explanation. It will be noted, however, that the method may be used with any wireless device, as appropriate, and the wireless protocols may be any wireless protocols While the steps described below are shown in a certain order, it should be noted that, according to various embodiments, one or more of the steps may be omitted, repeated, or performed in a different order than shown. For example, steps 402 and 404 are described as being performed at a first time, while steps 406-412 are described as being performed at a second time. It will be noted, though, that the first time may be before or after the second time, thus in this case 'first' and 'second' do not necessarily refer to temporal order.

In 402, first signals (e.g., WLAN signals) having only components according to a first wireless protocol (e.g., WLAN) may be received at a chip. The first signals may be received at a first time. In other words, at the first time, the wireless device in which the chip is implemented may not be receiving signals according to the second wireless protocol (e.g., Bluetooth), but only signals according to the first wireless protocol.

In 404, the first signals may be processed on the chip according to the first wireless protocol. Since the first signals do not contain components according to any other wireless protocols, there may be no need to split or otherwise modify the signals for provision external to the chip. Thus, the chip may simply process the first signals according to the first wireless protocol.

In 406, second signals having components according to both the first wireless protocol and a second wireless protocol may be received at the chip. The second signals may be received at a second time. In other words, at the second time, the wireless device in which the chip is implemented may be receiving both signals according to the first wireless protocol and the second wireless protocol; for example, the wireless device may receive both WLAN and Bluetooth signals simultaneously, and thus the received signals may have components according to both wireless protocols. Steps 408, 410, and 412 may also occur at the second time, and be performed based on reception at the chip of the second signals.

In 408, the second signals may be amplified to produce amplified second signals. The chip may include one or more gain elements to amplify the second signals. In one embodiment, there may be a first gain element (e.g., LNA 242 in FIG. 3) configured to amplify the second signals to produce amplified second signals. The amplified second signals may be split, e.g., into a first portion and a second portion. For example, the amplified second signals may be split at splitter 243 in FIG. 3. Thus, because the second signals were amplified prior to being split, no significant SNR loss due to splitting of the amplified second signals may be incurred. The first portion of the amplified second signals may be processed according to the first wireless protocol, e.g., in step 410. The second portion may be provided to a second gain element (e.g., LNA output driver 244 in FIG. 3) and eventually external to the chip for processing according to the second wireless protocol, e.g., in step 412.

In some embodiments, the gain of the first gain element and the gain of the second gain element may be variable. For example, the gain of the first gain element may be dynamically adjusted in order to provide signals of appropriate signal strength to the chip for processing. If only the first gain element were to be dynamically adjusted, the signal strength of the second portion of the amplified signals would be variable. In order to avoid this, the second gain element may also be dynamically adjusted based on the gain of the first gain element. For example, adjustment of the gain of the second gain element may be inversely proportional to the gain adjustment of the first gain element. Thus, the second portion of the amplified second signals may have a substantially constant gain relative to the received second signals. It should be noted that in some embodiments, due to the analog nature of the signals, it may be difficult to adjust the gains of the first and second gain elements to produce a precisely constant gain relative to the received second signals, and a substantially constant gain relative to the received second signals may be acceptable. As used herein, 'substantially constant' may include gain variations of less than 1 dB greater or less than the intended gain. However, it should be noted that a more precisely constant gain may also be attainable in some embodiments; for example, in some embodiments, variation may be within 0.5 dB of the intended gain, or even less.

In 410, a first portion of the amplified second signals may be processed. The first portion of the amplified second signals may be processed by first wireless protocol circuitry, e.g., by WLAN circuitry, and according to the first wireless protocol.

In 412, a second portion of the amplified second signals may be provided external to the chip for processing. For example, the second portion may be provided to a chip implementing the second wireless protocol, such as the Bluetooth block 140 in FIG. 3. Because the second portion may have a constant gain differential relative to the received second signals, the Bluetooth block may be able to account for that gain differential in processing the second portion of the amplified second signals and determining RSSIs.

The second portion of the amplified second signals provided external to the chip may have a different gain differential relative to signals having only components according to the second wireless protocol and provided directly to the portion of the wireless device implementing the second wireless protocol. For this reason, it may in some embodiments be desirable to send an indication external to the chip (e.g., from the WLAN chip to a Bluetooth chip) indicating if the chip is not receiving second signals. In this way, the portion of the wireless device implementing the second wireless protocol (e.g., a Bluetooth chip) may be able to determine what assumption it should make regarding the gain of the signals it is receiving. For example, if the Bluetooth chip is receiving Bluetooth-only signals and shared reception is turned off, the WLAN chip may send a signal indicating that shared reception is off to the Bluetooth chip. Thus, the Bluetooth chip may assume that any signals it receives have not been processed by the WLAN chip. If the WLAN chip doesn't send this indication to the Bluetooth chip, the Bluetooth chip may assume it is receiving signals with known, constant gain from the WLAN chip.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
an antenna for receiving wireless signals;
first wireless protocol circuitry coupled to the antenna and configured to receive first signals from the antenna, wherein the first wireless protocol circuitry is configured to process the first signals according to the first wireless protocol;
second wireless protocol circuitry coupled to the antenna and configured to receive second signals from the antenna, wherein the second wireless protocol circuitry is configured to process the second signals according to the second wireless protocol;
wherein the first wireless protocol circuitry comprises a first shared gain element;
wherein when the wireless device is receiving third signals having components according to both the first wireless protocol and the second wireless protocol, the first wireless protocol circuitry is configured to receive the third signals from the antenna, and the first shared gain element is configured to amplify the third signals to produce amplified third signals;
wherein a first portion of the amplified third signals is processed by the first wireless protocol circuitry, and wherein a second portion of the amplified third signals is provided from the first wireless protocol circuitry to the second wireless protocol circuitry for processing, wherein the second portion of the amplified third signals has a substantially constant gain relative to the received third signals.

2. The wireless device of claim 1,
wherein the first wireless protocol circuitry is configured to dynamically adjust a gain of the first shared gain element;
wherein the first wireless protocol circuitry further comprises a second gain element, wherein the second gain element is configured to adjust the signal strength of the second portion of the amplified third signals, wherein the first wireless protocol circuitry is configured to dynamically adjust a gain of the second gain element to provide signals having a substantially constant gain relative to the received third signals to the second wireless protocol circuitry for processing.

3. The wireless device of claim 1,
wherein said dynamically adjusting the gain of the second gain element to provide signals having a substantially constant gain relative to the received third signals to the second wireless protocol circuitry is based on dynamically adjusting the gain of the first shared gain element.

4. The wireless device of claim 1,
wherein the first portion of the amplified third signals and the second portion of the amplified third signals do not have significant signal-to-noise degradation relative to the third signals provided by the antenna.

5. The wireless device of claim 1,
wherein the first wireless protocol circuitry is comprised on a first semiconductor chip; and
wherein the second wireless protocol circuitry is comprised on a second semiconductor chip.

6. The wireless device of claim 1,
wherein the first wireless protocol is wireless LAN (WLAN) and the second wireless protocol is Bluetooth.

7. The wireless device of claim 1, wherein when the first wireless protocol circuitry does not receive the third signals, the first wireless protocol circuitry is configured to send a signal to the second wireless protocol circuitry indicating that the first wireless protocol circuitry is not receiving third signals.

8. A chip for use in a wireless device, wherein the chip implements a first wireless protocol, wherein the chip is intended to operate in a wireless device that implements the first wireless protocol and a second wireless protocol, the chip comprising:
first wireless protocol circuitry configured to process received signals according to the first wireless protocol;
first and second gain elements coupled to the first wireless protocol circuitry;
wherein the chip is operable to receive first signals having only components according to the first wireless protocol;
wherein the first wireless protocol circuitry is configured to process the first signals according to the first wireless protocol;
wherein the chip is operable to receive second signals having components according to both the first wireless protocol and the second wireless protocol;
wherein the first gain element is configured to amplify the second signals to produce amplified second signals, wherein the first wireless protocol circuitry is configured to dynamically adjust a gain of the first gain element to provide signals of appropriate signal strength to the first wireless protocol circuitry;
wherein a first portion of the amplified third signals is processed by the first wireless protocol circuitry, and wherein a second portion of the amplified third signals is provided from the first wireless protocol circuitry external to the chip for processing, wherein the second portion of the amplified third signals has a substantially constant gain relative to the received third signals.

9. The chip of claim 8,
wherein the first wireless protocol circuitry is configured to dynamically adjust a gain of the first shared gain element;
wherein the first wireless protocol circuitry further comprises a second gain element, wherein the second gain element is configured to adjust the signal strength of the second portion of the amplified third signals, wherein the first wireless protocol circuitry is configured to dynamically adjust a gain of the second gain element to provide signals having a substantially constant gain relative to the received third signals external to the chip for processing.

10. The chip of claim 9,
wherein said dynamically adjusting the gain of the second gain element to provide signals having a substantially constant gain relative to the received second signals external to the chip for processing is based on dynamically adjusting the gain of the first shared gain element.

11. The chip of claim 8, wherein when the first wireless protocol circuitry does not receive the second signals, the first wireless protocol circuitry is configured to send a signal external to the chip indicating that the first wireless protocol circuitry is not receiving second signals.

12. The chip of claim 8,
wherein the first portion of the amplified second signals and the second portion of the amplified second signals do not have significant signal-to-noise degradation relative to the second signals.

13. The chip of claim 8,
wherein the at least a second portion of the amplified second signals is provided external to the chip to a second chip that implements the second wireless protocol.

14. A method for simultaneously receiving first wireless signals according to a first wireless protocol and second wireless signals according to a second wireless protocol, the method comprising:
at a first time,
receiving at a chip first signals having only components according to the first wireless protocol; and
processing the first signals on the chip according to the first wireless protocol;
at a second time,
receiving at the chip second signals having components according to both the first wireless protocol and the second wireless protocol;
amplifying the second signals to produce amplified second signals, wherein said amplifying is performed by at least a first gain element on the chip;
processing a first portion of the amplified second signals on the chip according to the first wireless protocol;
providing a second portion of the amplified second signals external to the chip for processing according to the second wireless protocol, wherein the second portion of the amplified second signals has a substantially constant gain relative to the received second signals.

15. The method of claim 14, the method further comprising, at the second time:
dynamically adjusting a gain of the at least a first gain element;
providing the second portion of the amplified second signals to at least a second gain element on the chip;
dynamically adjusting a gain of the at least a second gain element, wherein the gain adjustment of the at least a second gain element is inversely proportional to the gain adjustment of the at least a first gain element, such that the second portion of the amplified second signals has a substantially constant gain relative to the received second signals.

16. The method of claim 14, the method further comprising:
if the chip is not receiving second signals, providing an indication external to the chip that second signals are not being received at the chip.

17. A chip for use in a wireless device, wherein the chip implements a second wireless protocol, wherein the chip is intended to operate in a wireless device that implements a first wireless protocol and the second wireless protocol, the chip comprising:
a first input, wherein the first input is configured to receive first signals that only have components according to the second wireless protocol, wherein the first input is also configured to receive amplified second signals that have components according to both the first wireless protocol and the second wireless protocol;
a second input, wherein the second input is configured to receive a third signal indicating whether the chip is receiving first signals or amplified second signals;
second wireless protocol circuitry coupled to the first input and the second input
wherein the second wireless protocol circuitry is configured to process the first signals according to the second wireless protocol;
wherein the second wireless protocol circuitry is also configured to process the amplified second signals according to the second wireless protocol.

18. The chip of claim 17, wherein the amplified second signals are amplified by a substantially constant gain relative to second signals received by the wireless device.

19. The chip of claim 17,
wherein the amplified signals were amplified by a second chip that implements the first wireless protocol.

* * * * *